United States Patent
Domon

(10) Patent No.: US 6,678,781 B1
(45) Date of Patent: Jan. 13, 2004

(54) NETWORK CONFIGURATION METHOD

(75) Inventor: Wataru Domon, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/449,931

(22) Filed: Nov. 24, 1999

(30) Foreign Application Priority Data

Nov. 24, 1998 (JP) .......................................... 10-332743

(51) Int. Cl.[7] .......................... G06F 13/36; G06F 13/00
(52) U.S. Cl. ...................... 710/312; 710/110; 710/311
(58) Field of Search ............................... 709/221, 224, 709/227; 710/8, 100, 311, 305, 313; 713/400; 370/224, 452

(56) References Cited

U.S. PATENT DOCUMENTS

| | | | | |
|---|---|---|---|---|
| 5,287,357 A | * | 2/1994 | Tanaka et al. | 370/452 |
| 5,528,507 A | * | 6/1996 | McNamara et al. | 700/286 |
| 5,724,517 A | * | 3/1998 | Cook et al. | 709/227 |
| 5,878,232 A | * | 3/1999 | Marimuthu | 709/249 |
| 5,935,208 A | * | 8/1999 | Duckwall et al. | 709/221 |
| 6,032,261 A | * | 2/2000 | Hulyalkar | 713/400 |
| 6,078,963 A | * | 6/2000 | Civanlar et al. | 709/238 |
| 6,131,119 A | * | 10/2000 | Fukui | 709/224 |
| 6,157,972 A | * | 12/2000 | Newman et al. | 710/100 |
| 6,219,697 B1 | * | 4/2001 | Lawande et al. | 709/221 |
| 6,246,667 B1 | * | 6/2001 | Ballintine et al. | 370/224 |
| 6,366,964 B1 | * | 4/2002 | Shima et al. | 710/8 |

FOREIGN PATENT DOCUMENTS

| | | |
|---|---|---|
| JP | 10-200583 | 7/1998 |
| JP | 11215132 | 8/1999 |
| JP | 11215186 | 8/1999 |
| JP | 11355343 | 12/1999 |

* cited by examiner

*Primary Examiner*—Sumati Lefkowitz
*Assistant Examiner*—Christopher E. Lee
(74) *Attorney, Agent, or Firm*—Young & Thompson

(57) ABSTRACT

A network configuration method ensuring high reliability of bridge manager selection and bus reset is disclosed. After configuring each of the IEEE 1394 buses according to IEEE 1394 standard, a network management node is selected from a first IEEE 1394 bus including at least one node capable of network management. First, the first IEEE 1394 bus is configured such that the first IEEE 1394 bus belongs to the network management node. Then, an adjacent IEEE 1394 bus of the first IEEE 1394 bus is configured into a configured IEEE 1394 bus to produce an interim network such that the adjacent IEEE 1394 bus belongs to the network management node. The configuration of the adjacent IEEE 1394 bus is repeated until no adjacent IEEE 1394 bus which does not belong to the network management node is left in the IEEE 1394 network.

20 Claims, 13 Drawing Sheets

NODE_IDS REGISTER

OWNER_EUI_64 REGISTER

NODE ID MAP FORMAT

NODE ID MAP OF PORTAL A OF BRIDGE 11 IN FIG.4B

NODE ID MAP OF PORTAL A OF BRIDGE 12 IN FIG.4B

NODE ID MAP OF PORTAL B OF BRIDGE 11 IN FIG.4C

NETWORK TOPOLOGY MAP FORMAT

FIG.7A

| DATA LENGTH | CRC |
|---|---|
| 16 | 16 |
| MAP GENERATION COUNT || 
| 32 ||
| NODE ID MAP [0] ||
| 32 ||
| NODE ID MAP [1] ||
| 32 ||
| ⋮ ||
| NODE ID MAP [n-1] ||
| 32 ||

IN THE CASE OF FIG.4B

FIG.7B

| 4 | | CRC | |
|---|---|---|---|
| 1 | | | |
| 0 | 0 | 3FF | 2 |
| 0 | 9 | 3FF | 4 |

IN THE CASE OF FIG.4C

FIG.7C

| 4 | | CRC | |
|---|---|---|---|
| 2 | | | |
| 0 | 0 | 1 | 2 |
| 0 | 9 | 3FF | 4 |

IN THE CASE OF FIG.4D

FIG.7D

| 5 | | CRC | |
|---|---|---|---|
| 3 | | | |
| 0 | 0 | 1 | 2 |
| 0 | 9 | 2 | 4 |
| 2 | 3 | 3FF | 1 |

IN THE CASE OF FIG.4E

FIG.7E

| 5 | | CRC | |
|---|---|---|---|
| 4 | | | |
| 0 | 0 | 1 | 2 |
| 0 | 9 | 2 | 4 |
| 2 | 3 | 3 | 1 |

NETWORK TOPOLOGY MAP GENERATED BY NODE 61 IN FIG.9C

| 4 | | CRC | |
|---|---|---|---|
| 1 | | | |
| 0 | 0 | 3FF | 2 |
| 0 | 9 | 3FF | 4 |

NETWORK TOPOLOGY MAP GENERATED BY NODE 61 IN FIG.9D

| 5 | | CRC | |
|---|---|---|---|
| 2 | | | |
| 0 | 0 | 1 | 2 |
| 0 | 9 | 3FF | 4 |
| 1 | 3 | 3FF | 5 |

NETWORK TOPOLOGY MAP GENERATED BY NODE 61 IN FIG.9E

| 5 | | CRC | |
|---|---|---|---|
| 3 | | | |
| 0 | 0 | 1 | 2 |
| 0 | 9 | 2 | 4 |
| 1 | 3 | 2 | 5 |

FIG.14A

NODE ID MAP FORMAT

| DATA LENGTH | | NUMBER OF_PORTALS | |
|---|---|---|---|
| —16— | | —16— | |
| bus_id [0] | phy id [0] | bus_id [1] | phy id [1] |
| —10— | —6— | —10— | —6— |
| ⋮ | ⋮ | ⋮ | ⋮ |
| bus_id [n-1] | phy_id [n-1] | padding (if necessary) | |
| —10— | —6— | —16— | |

FIG.14B

NETWORK TOPOLOGY MAP FORMAT

| DATA LENGTH | CRC |
|---|---|
| —16— | —16— |
| MAP GENERATION COUNT | |
| NODE ID MAP [0] | |
| NODE ID MAP [1] | |
| ⋮ | |
| NODE ID MAP [n-1] | |

FIG.15A

NETWORK TOPOLOGY MAP IN FIG.13B

| 5 || CRC ||
|---|---|---|---|
| 1 ||||
| 3 || 4 ||
| 0 | 2 | 3FF | 0 |
| 3FF | 4 | 3FF | 0 |

FIG.15B

NETWORK TOPOLOGY MAP IN FIG.13C

| 5 || CRC ||
|---|---|---|---|
| 2 ||||
| 3 || 4 ||
| 0 | 2 | 1 | 0 |
| 3FF | 4 | 3FF | 0 |

FIG.16A

NETWORK TOPOLOGY MAP IN FIG.13B

| 4 || CRC ||
|---|---|---|---|
| 1 ||||
| 2 || 2 ||
| 0 | 6 | 3FF | 3 |

FIG.16B

NETWORK TOPOLOGY MAP IN FIG.13C

| 7 || CRC ||
|---|---|---|---|
| 2 ||||
| 2 || 2 ||
| 0 | 6 | 1 | 3 |
| 3 || 4 ||
| 3FF | 2 | 3FF | 0 |
| 1 | 4 | 3FF | 0 |

NETWORK CONFIGURATION METHOD

BACKGROUND OF THE INVENTION

1. Field of the Invention

The present invention relates to a communication network based on IEEE 1394 Serial Bus Standard and in particular to a network configuration method and management method of a network composed of a plurality of IEEE 1394 serial buses joined by one or more bridges.

2. Description of the Related Art

The IEEE 1394 standard defined in 1995 is an international standard for implementing a cost-effective and high-speed digital interface. The IEEE 1394 serial bus provides high-speed data transport of several hundreds of megabits per second and therefore enables real-time transport required for digital video data transmission. The IEEE 1394 further provides so-called plug-and-play function by which devices can be added or removed by users without initial settings. These advantages cause the IEEE 1394 digital interface to provoke widespread attention as a digital interconnect for both computer peripherals and consumer electronics including digital video cameras and digital television sets.

A device connected to the IEEE 1394 serial bus is called "node" and an identifier called node ID is assigned to each node. The plug-and-play is realized by an ID assignment function. More specifically, when detecting that a node is added to or removed from an IEEE 1394 bus, the IEEE 1394 bus is reset and thereafter reconfigured using the ID assignment function of automatically assigning a different ID to each node.

A node ID is written onto a 16-bit field, which is further divided into 10 bits of higher order as a bus ID of and 6 bits of lower order as a physical ID. The bus ID is used to identify each IEEE 1394 bus. The physical ID is used to identify each node connected to an IEEE bus. The present IEEE 1394 standard defines a bus configuration method of configuring a single bus by using only physical ID, resulting in a maximum of 63 nodes connected to the bus.

A bridge is a node capable of connecting two or more IEEE 1394 buses into a network in which each IEEE bus is uniquely identified by its bus ID. Such a bridge enables packet transfer between different IEEE 1394 buses, resulting in the increased number of nodes available in the whole network. In the case of a 10-bit bus ID used, a maximum of 1023 buses is available and therefore about 64,000 nodes can be connected in all. Further, in the case where the network is segmented by bridges, the reconfiguration of the IEEE 1394 bus caused by addition/removal of a node can be restricted within that segment and furthermore the traffic is also restricted within the segment. Therefore, the use efficiency of the network is expected to be improved.

A conventional network connection device has been proposed in Japanese Patent Unexamined Publication No. 10-200583. In this prior art, a plurality of IEEE 1394 networks are joined through a backbone network, where topology information for each network is recognized to produce a new topology information to allow easy data transfer between them.

IEEE P1394.1 working group is now extending IEEE 1394-1995 beyond a local bus by means of an IEEE 1394 bridge. Since the P1394.1 draft 0.03 has been published so far, hereafter this draft 0.03 is referenced to describe the model and operation of a bridge.

FIG. 1 shows a logical mode of a bridge, as currently defined in the P1394.1 draft 0.03. A connection between a bridge 10 and an IEEE 1394 bus is called "portal". A bridge consisting of two portals 20 and 21 is mainly considered. Each portal serves as a node on the corresponding IEEE 1394 bus and monitors a packet on the bus to determine whether the packet on the bus is to be transferred to another bus. In the case of asynchronous packet, the bus ID field of the destination ID included in its header is checked to perform the determination. In the case of isochronous packet, the channel number of its header is checked to perform the determination.

When receiving a packet to be transferred to another bus, one portal transfers the received packet to a switching fabric 30 installed in the bridge 10. The switching fabric 30 connects the portals 20 and 21 to route the transferred packet to the other portal. A cycle clock 40 is a common resource to which both portals shall be synchronized to perform the isocnronous (real-time) transfer between buses, which is a feature of the IEEE 1394.

In the P1394.1 draft 0.03, a bridge manager is now proposed as a network management node. The role of the bridge manager is not explicitly defined in the P1394.1 draft 0.03 but several functions are proposed, for example, assignment of a bus ID to each bus, setting of routing map used to determine whether an asynchronous packet is permitted to be transferred, and network topology management.

In order to realize the IEEE 1394 multi-bus network using bridges as described above, the configuration procedure of the network is needed, including bus-ID assignment, routing map setup of a portal, and the like. About this configuration procedure, the outline defined in the P1394.1 draft 0.03 will be explained with reference to FIG. 2.

Referring to FIG. 2, a bridge manager is selected as a network management node from the network (step S201). It should be noted that a selection method is not concretely described in the P1394.1 draft 0.03.

If there is at least one a not-configured bus which has not been set to allow packet transfer to and from another bus (YES in step S202), the selected bridge manager assigns a bus ID to the not-configured bus (step S203). More specifically, the bridge manager writes the bus ID onto a NODE_IDS register of each node connected to the not-configured bus. The NODE_IDS register is a register for scoring its own node ID.

Thereafter, the bridge manager initializes the routing information of all the bridges connected to the bus to which the node ID is assigned (step S204). In this stage, only part of the routing information is initialized to the extent that a packet sent by the bridge manager is allowed to be transferred.

Then, the steps S203 and S204 are repeatedly performed until all buses have been configured. When the configuration of all buses has been completed (NO in step S202), the bridge manager sets the routing information of the bridges to allow packet transfer between any of the buses (step S205).

Further, a method called Reset Notification is also proposed to suit to Bus Reset defined in IEEE 1394. In the case where a network consists of a single bus, it is possible to recognize the occurrence of bus reset in all the nodes connected to the bus. Contrarily, in the case where a network consists of two or more buses joined by one or more bridge, a node connected to a bus cannot be informed of the occurrence of bus reset in another bus because the bus reset is blocked by the bridge.

After bus reset, the respective node IDs of nodes connected to the bus are probably changed due to the reconfiguration of the bus. Therefore, packet transfer cannot be successfully performed without knowing the occurrence of the bus reset and the reassigned node IDs.

Although the reset notification method has not been finally defined, it would be basically such a scheme that, when bus reset occurs in a bus, a bridge connected to the bus informs another bus of the bus reset.

However, the above-mentioned IEEE 1394 network configuration procedure has the following disadvantages regarding bridge manager selection and the routing map setting in a portal, First, it is difficult to select a bridge manager with reliability. Since bus IDs have not been assigned, it is impossible to normally transfer packets between buses. Further, each candidate for bridge manager does not grasp the network topology and the number of candidates for bridge manager.

Secondly, the procedure of setting the routing map of a portal is divided into a first step and a second step. The first step is to perform the routing map setting to the extent that transaction from a bridge manager can be transferred. The second step is to perform the whole routing map setting after a bus ID has been assigned to every bus.

However, it is considered that such a two-step procedure cannot sufficiently ensure the reliability of Reset Notification. The reason is that packet transfer between buses cannot be normally performed under network configuration and thereby the Reset Notification fails.

SUMMARY OF THE INVENTION

An object of the present invention is to provide a network configuration method that ensures high reliability of bridge manager selection and bus reset.

Another object of the present invention is to provide a topology map suitable for the network configuration method in a network composed of a plurality of IEEE 1394 serial buses joined by bridges.

According to the present invention, a method for configuring an IEEE 1394 network composed of a plurality of IEEE 1394 buses joined by at least one IEEE 1394 bridge having at least two portals each portal having a single IEEE 1394 bus connected thereto is provided. The method comprises the steps of: a) configuring each of the IEEE 1394 buses according to IEEE 1394 standard; b) selecting a network management node from a first IEEE 1394 bus including at least one node capable of network management: c) configuring the first IEEE 1394 bus into a configured IEEE bus such that the first IEEE 1394 bus belongs to the network management node; d) configuring an adjacent IEEE 1394 bus of the first IEEE 1394 bus into a configured IEEE 1394 bus to produce an interim network such that the adjacent IEEE 1394 bus belongs to the network management node; and e) repeating the step d) until no adjacent IEEE 1394 bus which does not belong to the network management node is left in the IEEE 1394 network.

Preferably, the step c) comprises the steps of: c-1) assigning a bus identifier to the first IEEE 1394 bus; and c-2) writing a unique identifier of the network management node to all the portals connected to the first IEEE 1394 bus. The step d) comprises the steps of: d-1) assigning a bus identifier to the adjacent IEEE 1394 bus; and d-2) writing the unique identifier of the network management node to all the portals connected to the adjacent IEEE 1394 bus.

The step c) further comprises the steps of: c-3) creating a network topology map consisting of the first IEEE 1394 bus; and c-4) creating a routing map of each portal connected to the first IEEE 1394 bus. The step d) further comprises the steps of; d-3) updating the network topology map to represent the interim network: and d-4) updating the routing map of each portal on the interim network to allow data transfer on the interim network.

According to another aspect of the present invention, a method comprises the steps of: a) configuring each of the IEEE 1394 buses according to IEEE 1394 standard; b) selecting a network management node from an IEEE 1394 bus including at least one node capable of network management; c) configuring the IEEE 1394 bus into a configured IEEE bus such that the IEEE 1394 bus belongs to the network management node: d) configuring the adjacent IEEE 1394 bus into a configured IEEE 1394 bus to produce an interim network such that the adjacent IEEE 1394 bus belongs to the network management node; e) when an adjacent IEEE 1394 bus of the configured IEEE 1394 bus belongs to another network management node, determining one of the network management node and the other network management node depending on a predetermined rule; f) initializing the interim network produced by the one of the network management node and the other network management node; and g) repeating the steps d) through f) by the other of the network management node and the other network management node.

In the step b), the network management node is selected depending on network management performance comparison, physical identifier comparison, or unique identifier comparison.

In the step e), the one of the network management node and the other network management node is selected depending on network management performance comparison, unique identifier comparison, bus count comparison, or node count comparison.

According to still another aspect of the present invention, a network management node comprises: first means for configuring a small network composed of a part of the IEEE 1394 network including an IEEE 1394 bus connected to the network management node; second means for reconfiguring a new small network including an adjacent IEEE 1394 bus of the IEEE 1394 bus and repeating reconfiguration of the new small network to configure a network consisting of all IEEE 1394 buses on the IEEE 1394 network.

In other words, an IEEE 1394 network configuration method according to the present invention has such a basic idea that a bridge manager or a network management node configures a small network (or an interim network) including only a bus connected to the bridge manager and then extends the scale of the small network step by step to finally configure the whole network.

BRIEF DESCRIPTION OF THE DRAWINGS

FIG. 7A is a diagram showing a format of network topology map;

FIG. 7B is a diagram showing a format of network topology map at the time of FIG. 4B;

FIG. 7C is a diagram showing a format of network topology map at the time of FIG. 4C;

FIG. 7D is a diagram showing a format of network topology map at the time of FIG. 4D;

FIG. 7E is a diagram showing a format of network topology map at the time of FIG. 4E;

FIG. 14A is a diagram showing a format of node ID map;

FIG. 14B is a diagram showing a format of network topology map;

FIG. 15A is a diagram showing a network topology map generated by the node 60 at the time of FIG. 13B;

FIG. 15B is a diagram showing a network topology map generated by the node 60 at the time of FIG. 13C;

FIG. 16A is a diagram showing a network topology map generated by the node 61 at the time of FIG. 13B; and FIG. 16B is a diagram showing a network topology map generated by the node 61 at the time of FIG. 13C.

DETAILED DESCRIPTION OF THE PREFERRED EMBODIMENTS

Network Configuration Procedure

Figure 1:
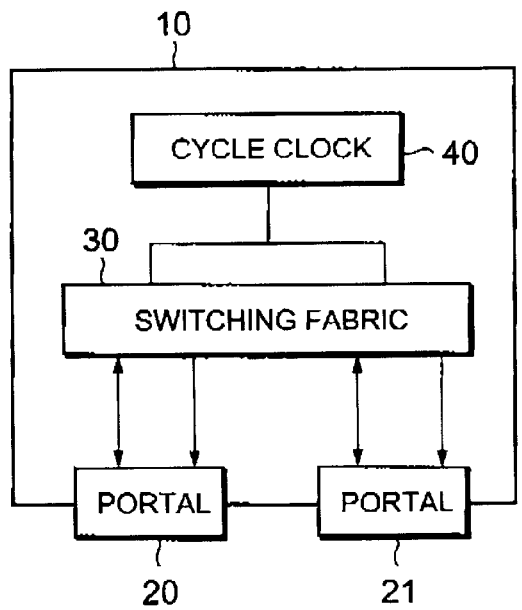
FIG. 1 is a block diagram showing the logical model of a bridge which is currently drafted by IEEE P1394.1.
Figure 2:
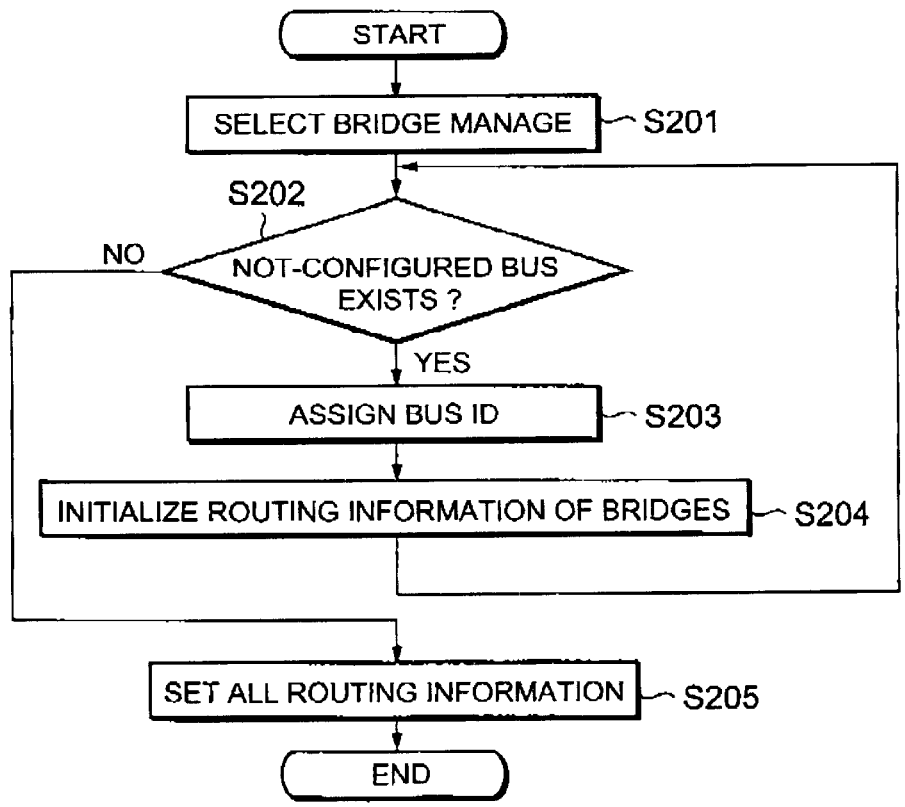
FIG. 2 is a flow chart showing a procedure of IEEE 1394 network configuration using IEEE bridge.
Figure 3:
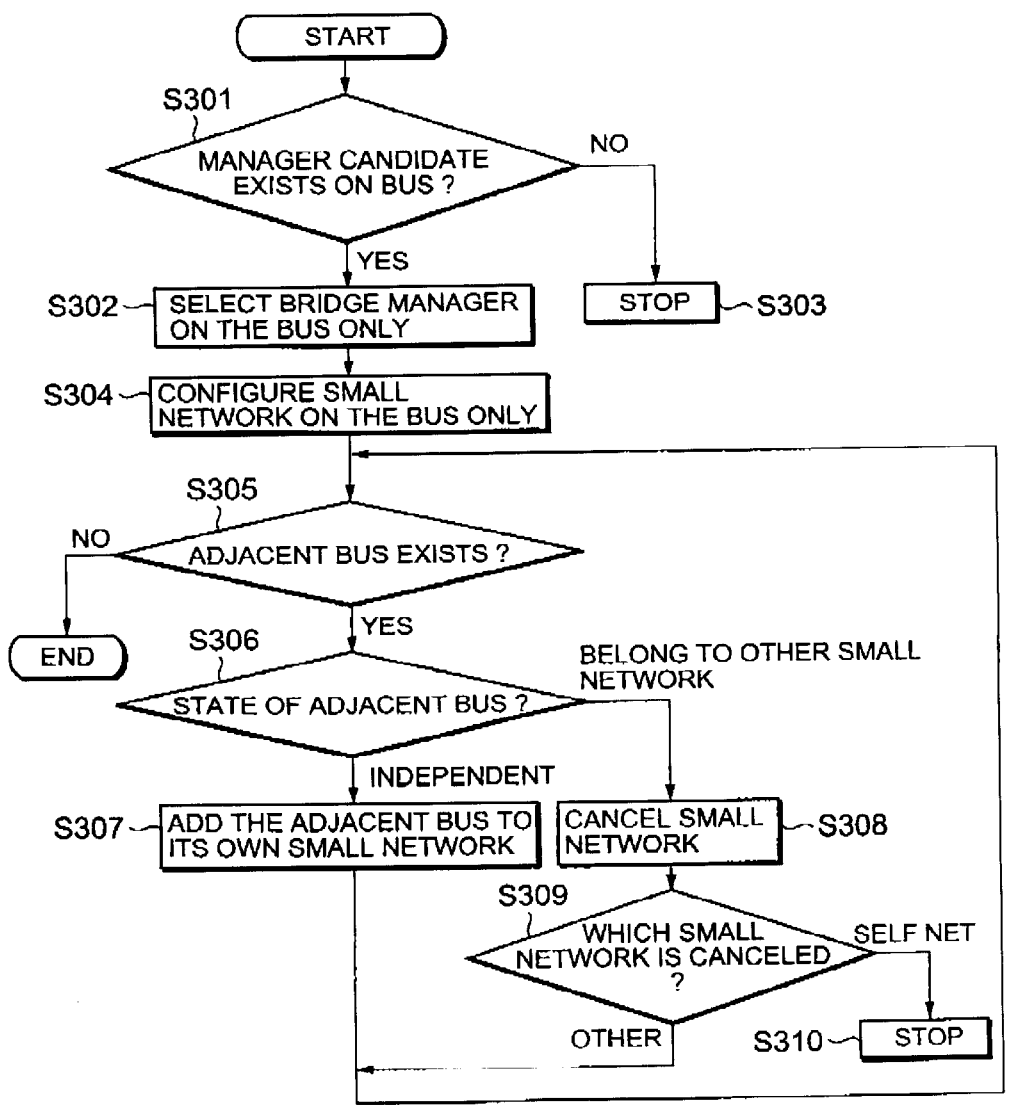
FIG. 3 is a flowchart showing a network configuration method according to the present invention.

FIG. 3 shows the outline of procedure according to the present invention. Here, there is shown the network configuration procedure after the bus configuration based on IEEE 1394-1995 standard is completed while paying attention to a single bus on the IEEE 1394 network.

After the bus configuration based on IEEE 1394-1995 standard has been made, it is determined whether a candidate node for bridge manager exists on an IEEE 1394 bus (step S301). If at least one candidate exists (YES in step S301), a bridge manager is selected from the IEEE 1394 bus only (step S302). If no candidate exists (NO in stop S301), this configuration procedure is stopped (step S303).

The selected bridge manager configures a small network (or an interim network) from only the IEEE 1394 bus connected to the bridge manager (step S304). More specifically, the bridge manager assigns a bus ID to the IEEE 1394 bus connected thereto and writes the global unique ID (GUID) assigned to the bridge manager to all the portals on the bus. Then, the bridge manager creates a network topology map.

Thereafter, the bridge manager determines whether there is an adjacent bus (step S305). More specifically, it is determined whether a bus having no bus ID assigned thereto exists in the network topology map created. If there is no bus adjacent thereto (NO in step S305), it means that all the buses are managed by the bridge manager, and therefore the configuration procedure is stopped.

If an adjacent bus exists (YES in step S305), the bridge manager reads the bridge manager's GUID stored in a portal on the adjacent bus to determine whether the adjacent bus belongs to its small network of the bridge manager (step S306). If the read GUID is an initial value, then it means that the adjacent bus does not belong to any of small networks configured by each selected bridge manager. Contrarily, if the read GUID is not the initial value, then it means that the adjacent bus belongs to any of the small networks other than its own small network.

When the adjacent bus does not belong to any of small networks, the bridge manager performs a procedure of adding the adjacent bus to its own small network (step S307). More specifically, the bridge manager assigns a bus ID to the adjacent bus and writes its own GUID to all the portals of the adjacent bus. Then, the bridge manager updates the network topology map by adding the adjacent bus thereto and further updates the routing map so as to allow packet transfer between any buses including the adjacent bus. Thereafter, control goes back to the step S305.

When the adjacent bus belongs to any of the small networks other than its own small network, the bridge manager performs a cancel procedure of canceling either its own small network or the other small network to which the adjacent bus belongs (step S308). More specifically, the bridge manager's GUID and the routing map of all portals on the small network to be canceled are initialized. If its own small network is canceled, the configuration procedure is stopped (step S310). On the other hand, when the other small network to which the adjacent bus belongs is canceled, control goes back to the step S305 so as to add the adjacent bus to its own small network.

According to the above-mentioned procedure, a bridge manager is selected from the candidates in one bus only. Therefore, only the normal transaction defined in IEEE 1394-1995 can be used to select a bridge manager. The routing map of a portal is updated each time a new bus is added so as to allow packet transfer between any buses. Therefore, the reset notification can be made with reliability even when a bus reset occurs in any bus of the configured network.

First Embodiment

Let us assume an IEEE 1394 network in which four buses 50–53 are joined by three bridges 10–12.

As shown in FIGS. 4A–4E, a bridge is represented by a circle which is a combination of two semicircles each representing a single portal, Therefore, here, a bridge has two portals. Note that the respective portals in a bridge are labeled "A" and "B" to discriminate between them.

Further, the parenthesized value adjacent to each portal is a node ID assigned to the node, the node ID consisting of a bus ID at the left thereof and a physical ID at the right thereof. A rectangle adjacent to each portal represents a routing map of the portal. The value of a bus ID is written onto the routing map. When a portal receives an asynchronous packet addressed to the same bus ID as the bus ID stored in the routing map thereof, the portal transfers the asynchronous packet to the other portal. The other portal, when receiving the asynchronous packet, sends it to its connected bus.

In this embodiment, furthermore, it is assumed that only a node 60 connected to the bus 50 is a bridge manager capable node or a candidate for bridge manager and no candidate for bridge manager exists on the other buses 51–53.

A network configuration procedure according to the first embodiment will be described hereinafter while referring to FIGS. 4A–4E and FIGS. 5–8.

Figure 4A:
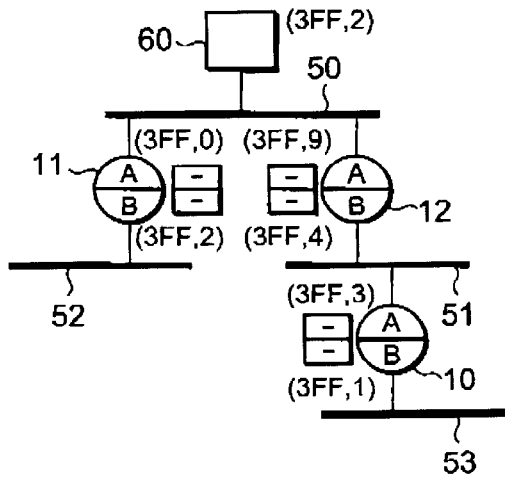
FIGS. 4A–4E are diagrams showing network configurations for explaining the operation of a first embodiment of the network configuration method according to the present invention.

Referring to FIG. 4A, first, the bus configuration conforming to the IEEE 1394-1995 standard is performed for each bus, so that an initial physical ID of 3FF(h) is assigned to each bus.

Subsequently, in the bus to which a manager candidate belongs, a bridge manager is selected. Here, since only the node 60 is a bridge manager capable node, the node 60 is selected as the bridge manager and the following network configuration procedure is performed in the bus 50. In the other buses 51–53, the network configuration procedure is not performed.

The bridge manager node 60 thereafter configures a small network consisting of the bus 50 only. More specifically, the node 60 performs the followings:

1) Assignment of bus ID to all the nodes on the bus 50;
2) Writing of the bridge manager ID (GUID) onto the portals on the bus 50; and
3) Creating a network topology map.

1) Assignment of Bus ID

Figure 4B:
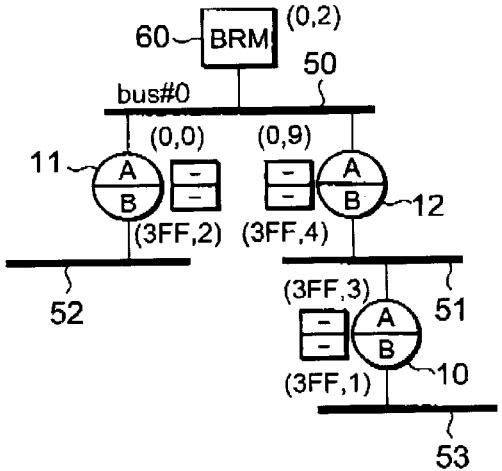
Figure 5A:
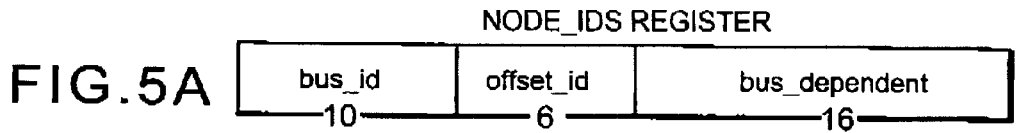
FIG. 5A is a diagram showing a format of NODE_IDS register.

The assignment of bus ID is performed by writing a bus ID onto the bus_id field of NODE_IDS register provided in each node on the bus 50. The NODE_IDS register has a predetermined format defined in IEEE 1394-1995 standard as shown in FIG. 5A. Assuming bus_ID=0, the bridge manager node 60 uses the broadcast write transaction to write the value of 0 onto the bus_Id field of NODE_IDS register provided in each node on the bus 50. In this way, the bus ID (bus#0) is assigned to the bus 50 as shown in FIG. 4B.

2) Writing of GUID

Figure 5B:
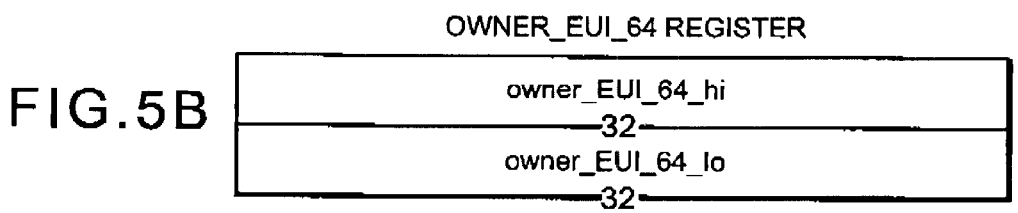
FIG. 5B is a diagram showing a format of OWNER_EUI_64 register.

The global unique ID (GUID) of the bridge manager node 60 is defined in P1394.1 draft 0.03 and is written onto OWNER_EUI_64 register provided in all the portals by the bridge manager node 60 using lock transaction. The OWNER_EUI_64 register having a format as shown in FIG. 5B is a register for storing EUI_64 of the bridge manager to be an owner of all portals. EUI_64 is 64-bit numeric data, which is a unique identifier used to identify the device itself in the world.

3) Creating a Network Topology Map

Figure 6A:
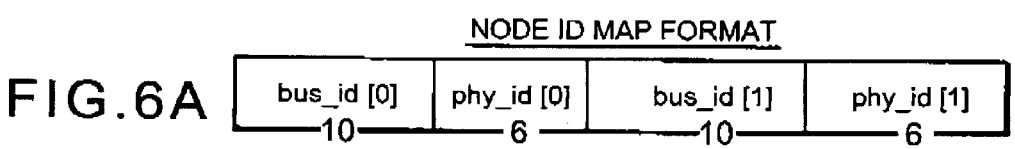
FIG. 6A is a diagram showing a format of node ID map.

The bridge manager node 60 creates a network topology map by collecting node ID maps from the portals on the bus 50. The node ID map of each portal is a combination of the node IDs of all portals on a bridge. The node ID map has a format consists of a left part for storing the node ID of one portal and a right part for storing the node ID of the other portal as shown in FIG. 6A.

Figure 6B:
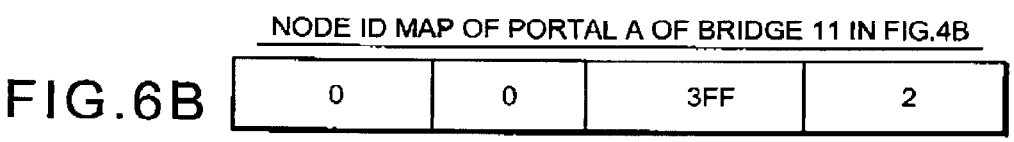
FIG. 6B is a diagram showing a format of node ID map of portal A of the bridge 11 in FIG. 4B.
Figure 6C:
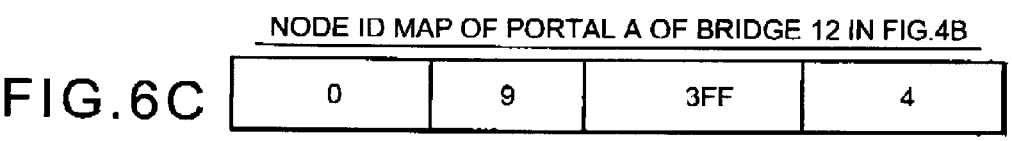
FIG. 6C is a diagram showing a format of node ID map of portal A of the bridge 12 in FIG. 4B.

Each portal of a bridge creates its own node ID map by using the NODE_IDS register for its own node ID and the PORTAL_CONROL register for the node ID of the other portal of the bridge. Therefore, the bridge manager node 60 collects the node ID maps from the portal A of the bridge 11 and the portal A of the bridge 12 to create the network topology map. The node ID map in the portal A of the bridge 11 is shown in FIG. 6B and the node ID map in the portal A of the bridge 12 is shown in FIG. 6C.

The format of a network topology map according the first embodiment is shown in FIG. 7A. A data length field stores the number of quadlets of a network topology map. A CRC field stores a CRC (Cyclic Redundancy Check) value for bit-error detection. The CRC field is followed by a map generation count which is the number of times the map is generated. The following field stores the collected node ID maps [0] to [n−1] from the portals. Therefore, in the state shown in FIG. 4B, the network topology map is created as shown in FIG. 7B.

This network topology map of FIG. 7B causes the bridge manager node 60 to recognize the current network topology as shown in FIG. B. More specifically, only the bus 50 connected to the node 60 has the bus ID (#0) assigned thereto. Further, the node 60 recognizes from the created network topology map of FIG. 7B that the bus #0 has two bridges 11 and 12 connected thereto and is further connected to two buses having no bus IDs through the bridges 11 and 12, respectively.

In this manner, the first small network is configured as shown in FIG. 4B. At this stage, the network consists of only one bus and therefore the routing map setting of a portal is not performed.

Subsequently, the node 60 reads the OWNER_EUI_64 register of the portal B of the bridge 11 and determines whether the OWNER_EUI_64 register has the initial value of 3FF(h). If OWNER_EUI_=64 3FF, it is determined that the bus 52 does not belong to its own network. On the other hand, in the case where neither the EUI_64 of the node nor the initial value of 3FF is equal to the value of the OWNER_EUI_64 register, it is determined that the bus 52 belongs to another network.

In this stage of FIG. 4B, since the OWNER_EUI_64 register has the initial value of 3FF(h), the node 60 determines that the bus 52 does not belong to any network. In this case, the node 60 starts the procedure that the bus 52 belongs to its own network. More specifically, the bus ID=1 is assigned to all the nodes on the bus 52 and then the GUID of the node 60 is written to all the portals on the bus 52.

Figure 6D:
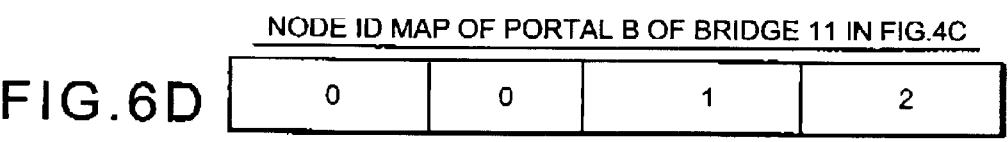
FIG. 6D is a diagram showing a format of node ID map of portal A of the bridge 11 in FIG. 4C.
Figure 8:
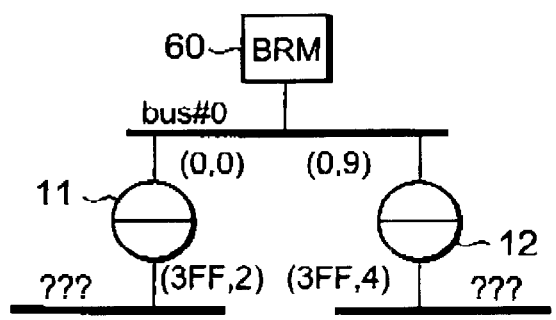
FIG. 8 is a diagram showing a network topology recognized by the bridge manager at the time of FIG. 4B.

Thereafter, the portal B of the bridge 11 sends the node ID map as shown in FIG. 6D to the node 60. When receiving the node ID map from the portal B of the bridge 11, the node checks whether the same node ID has been already stored in the network topology map As shown in FIGS. 6D and 7B, the node ID (0.0) of the received node ID map is identical to one of the stored node IDs in the network topology map. Therefore, the node 60 determines that the node ID map of the bridge 11 has been updated and writes the received node ID map over the corresponding field of the network topology map. In this manner, the network topology map is updated as shown in FIG. 7C.

Figure 4C:
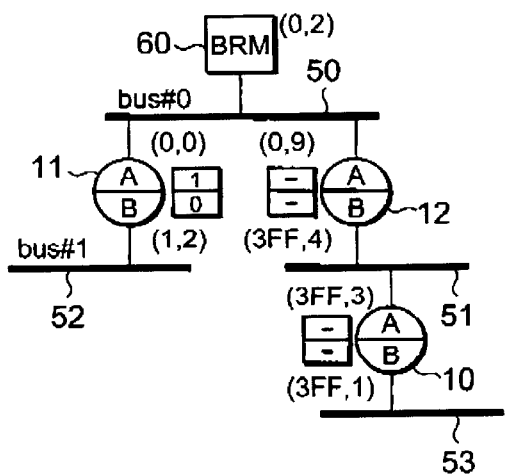

Subsequently, to allow packet transfer between the bus 50 and the bus 52, the routing maps of both portals of the bridge 11 are updated. More specifically, the bus ID=1 is added to the routing map of the portal A of the bridge 11. The bus ID=0 is added to the routing map of the portal B of the bridge 11. In this way, the bus 52 is caused to belong to the network of the node 60 as shown in FIG. 4C.

Figure 4D:
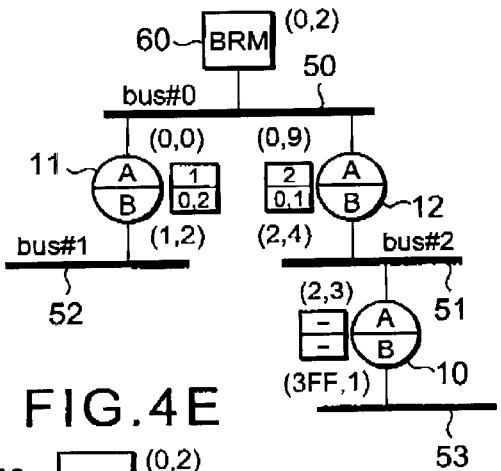

Next, the node 60 refers to the network topology map and recognizes that the bus 51 connected to the bridge 12 does not belong to its own network. Therefore, the same procedure as the case of the bus 52 as mentioned above is performed to cause the bus 51 to belong to the network of the node 60. In this manner, the node 60 configures the network consisting of the buses 50–52 as shown In FIG. 4D. At this stage, the network topology map has been updated as shown in FIG. 7D.

Figure 4E:
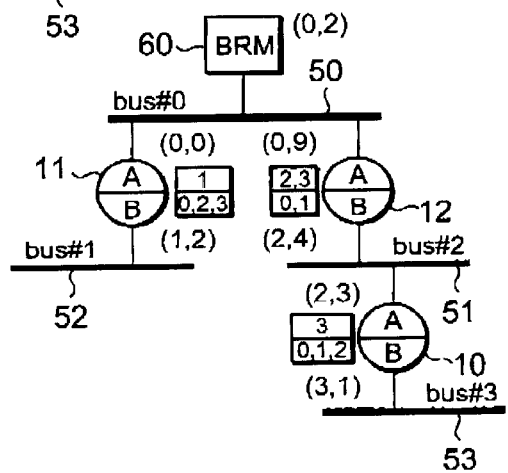

Further, the node 60 refers to the network topology map and recognizes that the bus 53 connected to the bridge 10 does not belong to its own network. Therefore, the same procedure as mentioned above is performed to cause the bus 53 to belong to the network of the node 60. In this manner, the node 60 configures the network consisting of the buses 50–53 as shown In FIG. 4E. At this stage, the network topology map has been updated as shown in FIG. 7E and no bus ID is left in the network topology map. Therefore, the network configuration procedure is completed.

In this embodiment, it is possible to perform the initial setting to allow isochronous transfer, that is, real-time transfer mode, in the whole network, in parallel with the above-mentioned procedure. The isochronos transfer needs to synchronize the buses with the clock. In IEEE 1394-1995 standard, a clock synchronization method of a single bus is defined. According to this method, a time management node is previously determined as a cycle master and the clocks of the other nodes are synchronized with the clock of the cycle master. The cycle master transmits a cycle start packet conveying time information to all the other nodes at intervals of 125 microseconds. The other node adjusts its own clock in accordance with the received time information.

On the other hand, in P1394.1 standard, another clock sync method in the IEEE network including a bridge is proposed such that a net cycle master is previously determined and the clocks of all the nodes on the network are synchronized with the clock of the net cycle master to achieve clock synchronization in the whole network. More specifically, the clock of a predetermined cycle master on each bus is synchronized with the clock of the net cycle master. To realize such a clock sync method, it is necessary to determine such a net cycle master and the routing from the net cycle master to the cycle master on each bus to transfer time information.

According to the embodiment of the present invention, after configuring the network consisting of a single bus only as described before, the net cycle master is selected from the bus. Then, the same route as the asynchronous packet determined based on the routing map of the portal as described before is used as the time information transfer route. Therefore, the initial setting of the isochronous transfer can be performed in parallel.

Second Embodiment

As shown in FIGS. 9A–9E, it is assumed that an IEEE 1394 network is composed of three buses 50–52 which are joined by three bridges 10–12. Further, it is assumed that two nodes 60 and 61 connected to the bus 50 are a candidate for bridge manager and no candidate for bridge manager exists on the other buses 51 and 52.

A network configuration procedure according to the second embodiment will be described hereinafter while referring to FIGS. 9A–9E and FIGS. 10–12.

Figure 9A:
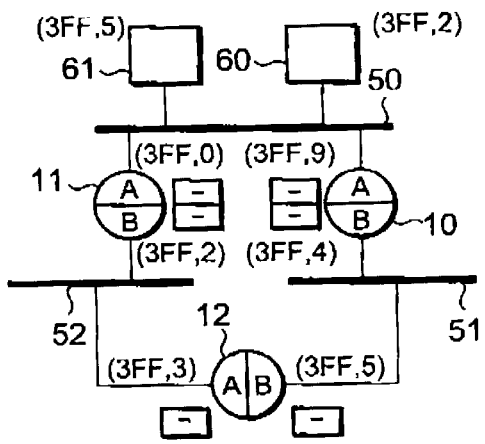
FIGS. 9A–9E are diagrams showing network configurations for explaining the operation of a second embodiment of the network configuration method according to the present invention.
Figure 9B:
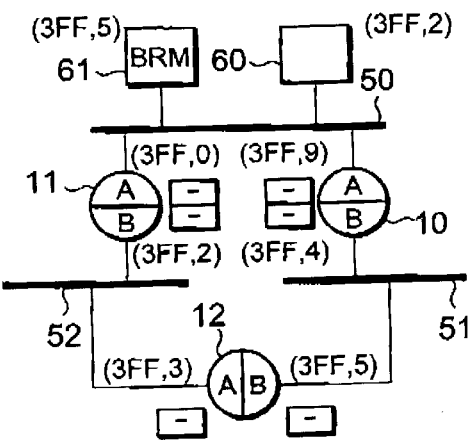

Referring to FIG. 9A, first, the bus configuration conforming to the IEEE 1394-1995 standard is performed for each bus, so that an initial physical ID of 3FF(h) is assigned to each bus.

subsequently, in the bus 50 to which a manager candidate belongs, a bridge manager is selected. Here, since two bridge manager capable nodes exist on the bus 50, the manager selection procedure is performed to determine one of the nodes 60 and 61 as a bridge manager. In this embodiment, physical-ID comparing method is employed such that one having a larger value of physical ID assigned thereto is selected as the bridge manager. In this example, the node 61 having the physical ID=5 is determined as the bridge manager as shown In FIG. 9B. It should be noted that the other node 60 that is not selected withdraws from the network configuration procedure, Therefore, the node 60 is not shown in FIGS. 9C–9E, 11 and 12.

Figure 9C:
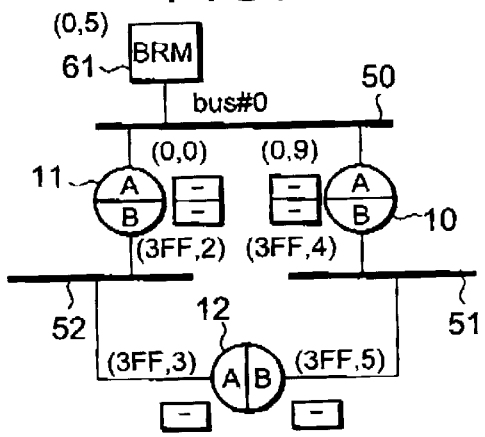
Figure 9D:
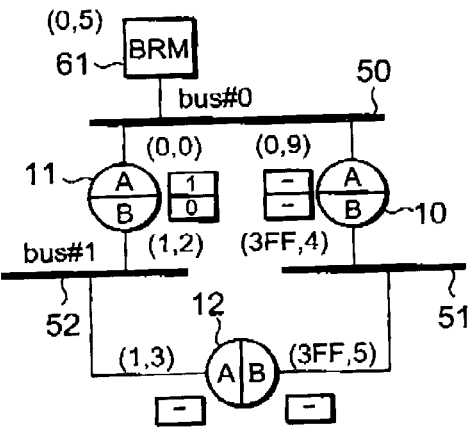
Figures 10A, 10B, 10C, 11:
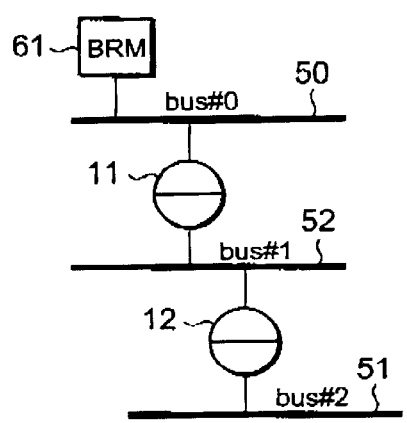
FIG. 10A is a diagram showing a network topology map generated by the node 61 at the time of FIG. 9C.
FIG. 10B is a diagram showing a network topology map generated by the node 61 at the time of FIG. 9D.
FIG. 10C is a diagram showing a network topology map generated by the node 61 at the time of FIG. 9E.
FIG. 11 is a diagram showing a network topology after network configuration.

The bridge manager node 61 thereafter configures a small network consisting of only the bus 50 with bus ID=0 as shown in FIG. 9C. This procedure is the same as described in the first embodiment. At this stage, the network topology map of the node 61 is shown in FIG. 10A, Subsequently, the node 61 adds the bus 52 connected to the bridge 11 to its own network by assigning the bus ID=1 to the bus 52. Further, by collecting node ID maps from the portals A and B of the bridge 11, the network topology map is updated as shown in FIG. 10B. To allow packet transfer between the buses 50 and 52, the routing map of the portals of the bridge 11 connecting the busses 50 and 52 is updated as shown in FIG. 9D.

Figure 9E:
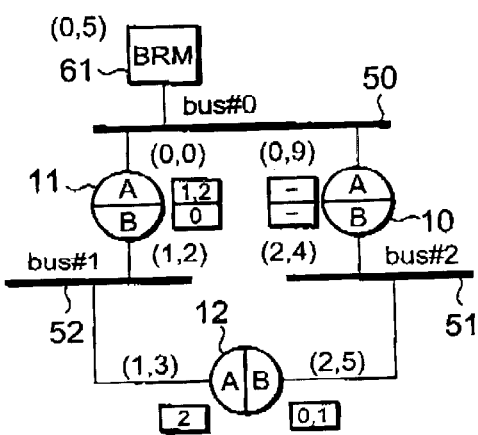

Thereafter, the node 61 adds the bus 51 connected to the bridge 12 to its own network by assigning the bus ID=2 to the bus 51. Further, by collecting node ID maps from the portal B of the bridge 10 and the portal B of the bridge 12, the network topology map is updated as shown in FIG. 10C. To allow packet transfer between any two of the buses 50–52, the routing maps of the bridges 11 and 12 is updated as shown in FIG. 9E. In this manner, the network configuration procedure is completed.

In the second embodiment, the routing map of the bridge is not set so as not to transfer a packet in a loop. Therefore, the logical topology of the network according to the embodiment has a tree structure as shown in FIG. 11.

Figure 12A:
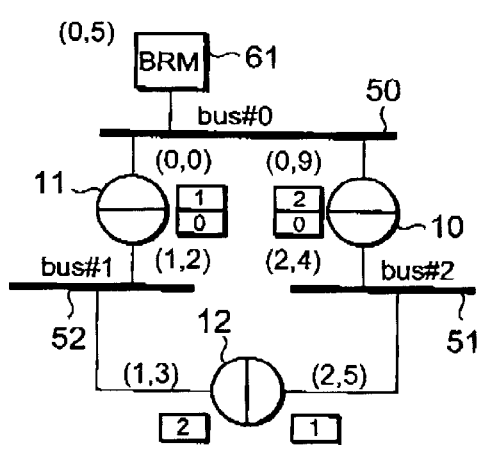
FIGS. 12A–12D are diagrams showing another setting result of routing map in network configurations according to the second embodiment.
Figure 12B:
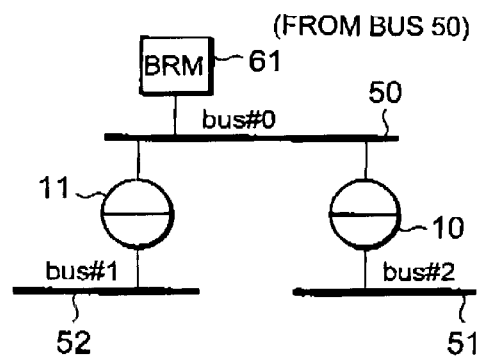
Figure 12C:
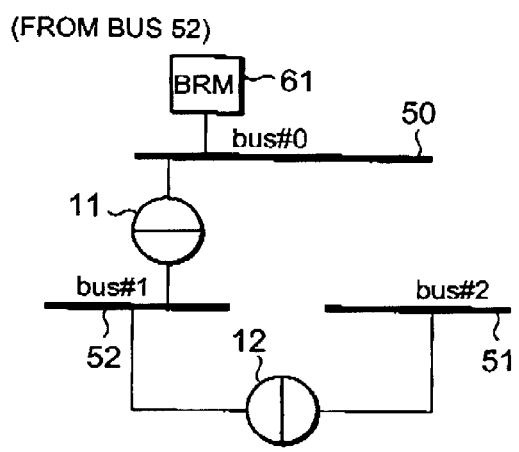
Figure 12D:
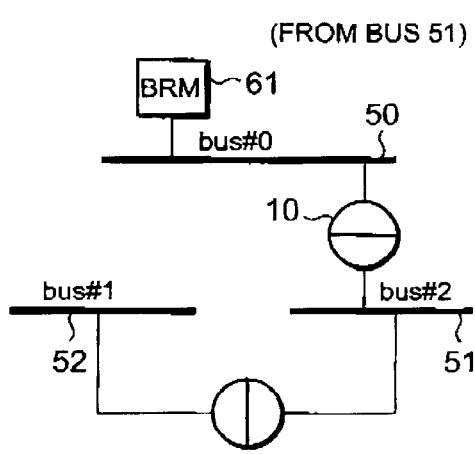

In the second embodiment, the routing map may be updated as shown in FIG. 12A so as to minimize the number of times packets pass through bridges. In this case, as shown in FIGS. 12B–12D, a different logical topology is obtained depending on the standpoint of a bus sending a packet.

Further, in the second embodiment, the physical ID comparing method is used to determine a bridge manager. Alternatively, a performance comparing method or a GUID comparing method may be used. In the case of the performance comparing method, the bridge manger performance of each node is converted into a numeric value and then such a numeric value is compared with that of another node. In this case, two or more nodes are likely to have the same performance. Therefore, it is necessary to use the performance comparing method with another parameter uniquely assigned to each node.

Third Embodiment

As shown in FIGS. 13A–13E, it is assumed that an IEEE 1394 network is composed of five buses 50–54 joined by two bridges 10 and 11. Further, it is assumed that a node 60 on the bus 50 and a node 61 on the bus 54 are both a candidate for bridge manager and no candidate for bridge manager exists on the other buses 51–53. Furthermore, In the third embodiment, the bridge 10 has four portals A, B. C, and D, which are connected to the buses 50, 51, 52, and 53, respectively. The bridge 10 is represented by a combination of a single rectangle and four semicircles which are respectively labeled "A", "B", "C", and "D".

Each of the portals A, B, C, and D is provided with an input routing map and an output routing map so as to determine which is the destination portal of a packet received from outside. More specifically, the input routing map is used for a portal to determine whether a packet on an outside bus should be accepted into the bridge. The output routing map is used for the portal to determine whether a packet on the switching fabric of the bridge should be transferred to an outside bus connected thereto. These respective routing maps have only bus IDs written thereto.

A network configuration procedure according to the third embodiment will be described hereinafter while referring to FIGS. 13A–13E and FIGS. 14–16.

Figure 13A:
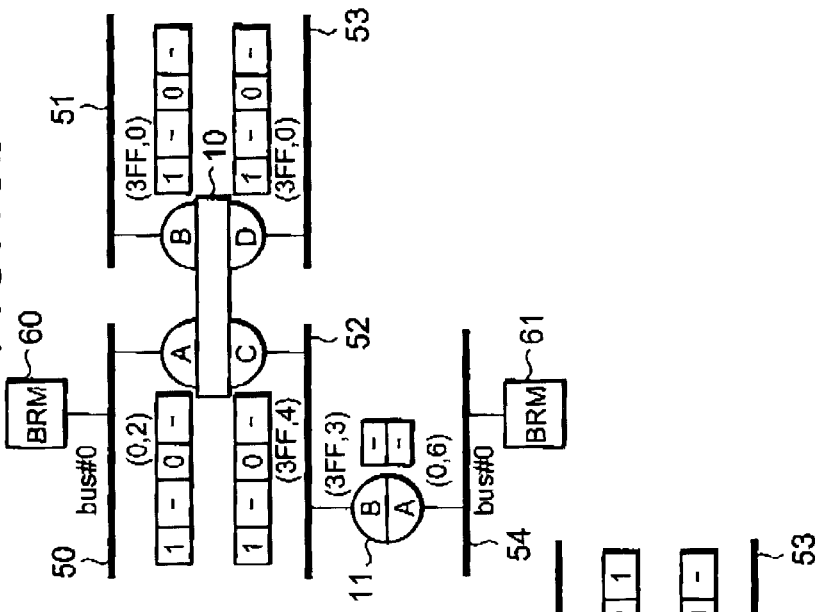
FIGS. 13A–13E are diagrams showing network configurations for explaining the operation of a third embodiment of the network configuration method according to the present invention.

Referring to FIG. 13A, first, the bus configuration conforming to the IEEE 1394-1995 standard is performed for each bus, so that an initial physical ID of 3FF(h) is assigned to each bus.

Figure 13B:
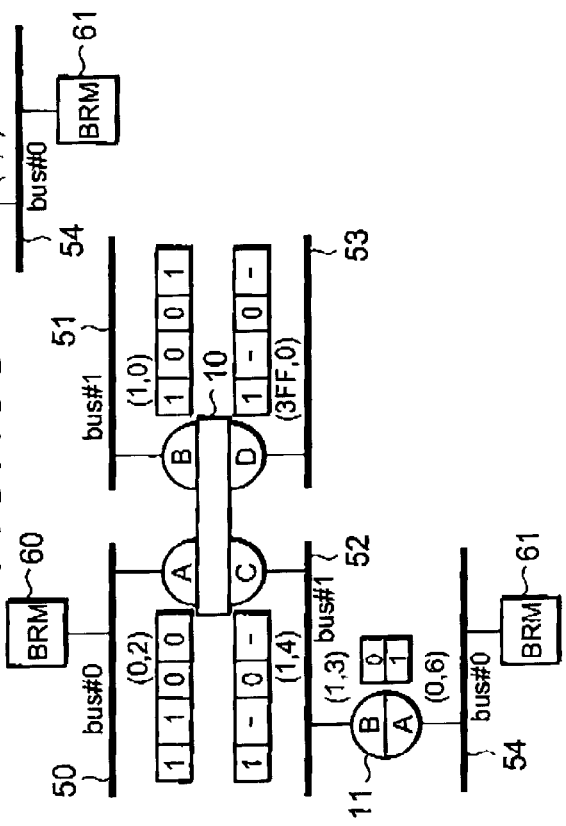

Subsequently, the node 60 on the bus 50 and the node 61 on the bus 54 are selected as a bridge manager. Each of the nodes 60 and 61 configures an IEEE 1394 network consisting of only the bus connected thereto. Therefore, at this stage, bus ID=0 is assigned to both buses 50 and 54 as shown in FIG. 13B.

The node 60 creates a network topology map by collecting a node ID map from the portal A of the bridge 10. The node 61 creates a network topology map by collecting a node ID map from the portal A of the bridge 11. In this embodiment, the node ID map having a format as shown in FIG. 14A and the network topology map having a format as shown in FIG. 14B are used. It should be noted that these include the field for the number of portals included in a bridge and therefore these can be applied to a bridge having three or more portals.

The node ID map is written to the network topology map after the bus ID field of a portal belonging to another network is changed to the Initial value of 3FF. This causes the bridge manager to retrieve a portal that does not belong to its own network by only looking at the bus ID field of the map.

Further, in the node ID map in this embodiment, a virtual node ID that is not changed when a bus reset occurs is used for only a portal belonging to its own network. At this stage as shown in FIG. 13B, the network topology maps as shown in FIGS. 15A and 15B are stored in the nodes 60 and 61, respectively.

Figure 13C:
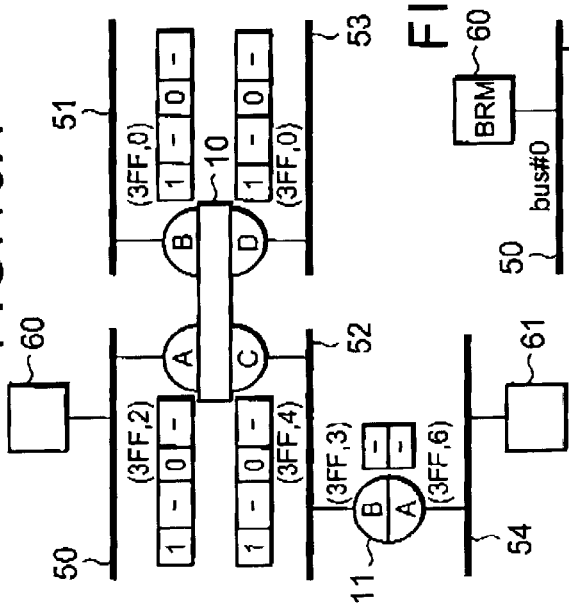

Subsequently, the node 60 adds the bus 51 to its own network by assigning the bus ID=1 to the bus 51. On the other hand, the node 61 adds the bus 52 to its own network by assigning the bus ID=1 to the bus 52. At this stage, the respective network topology maps are updated as shown in FIG. 15B and FIG. 16B. For example, although the node 61 assigns bus ID=1 to the portal C of the bridge 10 belonging to its own network, the bus ID of the portal C is changed to 3FF in the network topology map of the node 60 as shown in FIG. 15B. At this stage, the state of the network where the portal routing maps have been set is shown in FIG. 13C.

Subsequently, the node 60 checks the use state of the portal C of the bridge 10 and thereby it is determined that the portal C already belongs to the network managed by the node 61. In this case, a network cancel procedure of canceling one of the networks is started between the nodes 60 and 61. In this embodiment, the node 60 compares it own GUID with the GUID of the node 61 and then one which has a smaller GUID cancels its own network.

Figure 13D:
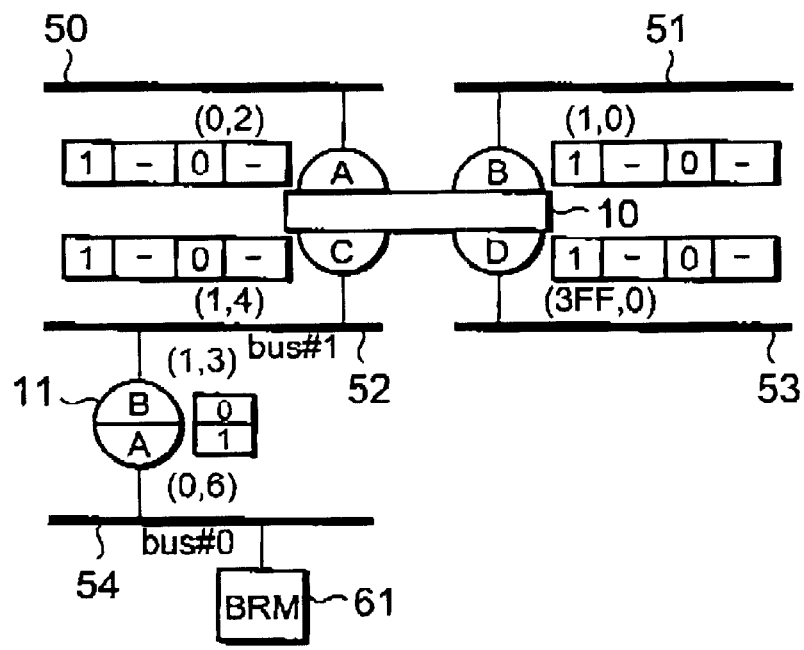

More specifically, the node 60 compares its own GUID with the value of the OWNER_EUI_64 register of the portal C of the bridge 10. If the node 60 determines that its own GUID is smaller than the value of the OWNER_EUI_64 register of the portal C of the bridge 10, then the node 60 cancels its own network. In other words, the node 60 initializes values for the portals A and B of the bridge 10 belonging to its own network in the routing map and the OWNER_EUI_64 registers. At this stage, the state of the network is shown in FIG. 13D.

The network cancel can be also performed by comparing node performance such as processing speed, comparing the number of buses belonging to each network, comparing the number of nodes belonging to each network, comparing the number of isochronous streams in transfer via bridge, or a combining them.

In this embodiment, the node 60 to cancel its own network initializes values for the portals in the routing map and the OWNER_EUI_64 registers. In addition, NODE_IDSs and bus_IDs of all the nodes on the buses 50 and 51 as well as the network topology map of the node 60 may be also initialized.

Figure 13E:
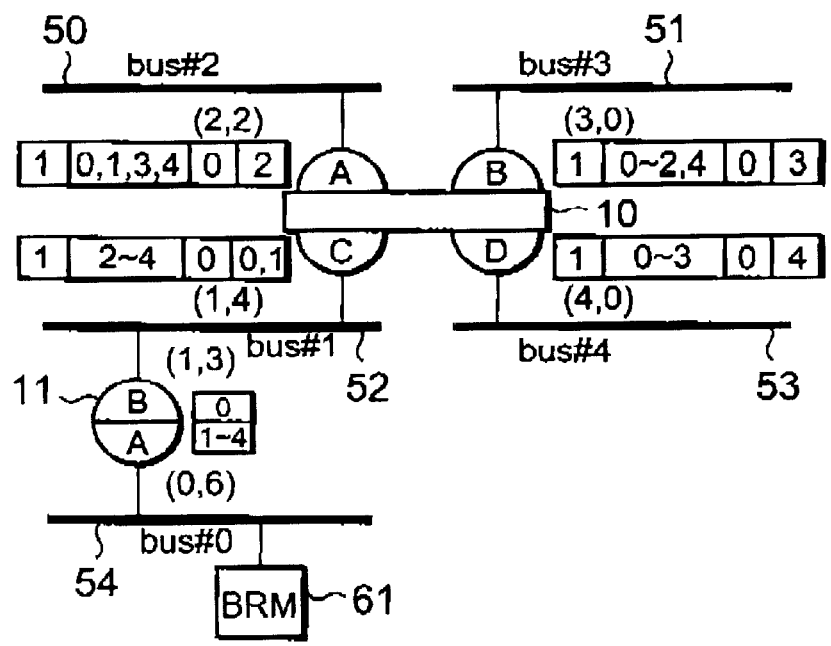

After initialized by the node 6, the node 61 sequentially adds all the buses to its own network as described before. At this stage, the state of the network is shown in FIG. 13E.

What is claimed is:

1. A method for configuring an IEEE 1394 network composed of a plurality of IEEE 1394 buses joined by at least one IEEE 1394 bridge having at least two portals, each of the portals having a single IEEE 1394 bus connected thereto, comprising the steps of:

a) configuring each of the IEEE 1394 buses according to IEEE 1394 standard with each node including a node identification comprising a first part storing a bus identification indicating a non-configured bus and a second part storing a physcal identification;

b) selecting a network management node from a first IEEE 1394 bus including at least one node capable of network management;

c) configuring the first IEEE 1394 bus into a configured IEEE bus such that the first IEEE 1394 bus belongs to the network management node with the node identification of each node connected to the first IEEE 1394 bus including in the first part a bus identification indicating the first IEEE 1394 bus, each of the nodes of buses other than the first IEEE 1394 bus continuing to have the bus identification indicating a non-configured bus;

d) upon completion of configuring the first IEEE 1394 bus, configuring an adjacent IEEE 1394 bus of the fist IEEE 1394 bus into a configured IEEE 1394 bus to produce an interim network such that the adjacent IEEE 1394 bus belongs to the network management node with the node identification of each node connected to the adjacent IEEE 1394 bus including in the first part a bus identification indicating the adjacent IEEE 1394 bus, each of the nodes of buses other than the first IEEE 1394 bus and the adjacent IEEE 1394 bus continuing to have the bus identification indicating a non-configured bus; and e) upon completing step d), repeating the step d) until no adjacent IEEE 1394 bus which does not belong to the network management node is left in the IEEE 1394 network and the first part of each node identification within the IEEE 1394 network is free of the common bus identification indicating a non-configured bus.

2. The method according to claim 1, wherein:
the step c) comprises the steps of:
- c-1) assigning a bus identifier to the first IEEE 1394 bus; and
- c-2) writing a unique identifier of the network management node to all the portals connected to the first IEEE 1394 bus, the writing of the unique identifier of the network management node being limited to portals directly connected to the first IEEE 1394 bus, and
the step d) comprises the steps of:
- d-1) assigning a bus identifier to the adjacent IEEE 1394 bus; and
- d-2) writing the unique identifier of the network management node to all the portals connected to the adjacent IEEE 1394 bus, the writing of the unique identifier of the network management node being limited to portals directly connected to the adjacent IEEE 1394 bus.

3. The method according to claim 2, wherein:
the step c) further comprises the steps of:
- c-3) creating a network topology map consisting of the first IEEE 1394 bus; and
- c-4) creating a routing map of each portal connected to the first IEEE 1394 bus, and the step d) further comprises the steps of:
- d-3) updating the network topology map to represent the interim network; and
- d-4) updating the routing map of each portal on the interim network to allow data transfer on the interim network.

4. The method according to claim 2, wherein:
in the step c-1), the bus identifier is written to all nodes connected to the first IEEE 1394 bus;
in the step d-1), the bus identifier is written to all nodes connected to the adjacent IEEE 1394 bus; and
in the steps c-2) and d-2), the unique identifier of the network management node is a global unique identifier (GUID).

5. The method according to claim 1, wherein the step d) is performed when the first part of the node identifications of the adjacent IEEE 1394 bus of the configured IEEE 1394 bus includes the common bus identification for a non-configured bus.

6. A method for configuring an IEEE 1394 network composed of a plurality of IEEE 1394 buses joined by at least one IEEE 1394 bridge having at least two portals, each of the portals having a single IEEE 1394 bus connected thereto, comprising the steps of:
- a) configuring each of the IEEE 1394 buses according to IEEE 1394 standard so that each node includes a node identification comprising a first part storing a common bus identification indicating a non-configured bus and a second part storing a physical identification;
- b) selecting a network management node from an IEEE 1394 bus including at least one node capable of network management;
- c) configuring the IEEE 1394 bus into a first configured IEEE bus such that the IEEE 1394 bus belongs to the network management node;
- d) configuring an adjacent IEEE 1394 bus into a second configured IEEE 1394 bus to produce an interim network such that the adjacent IEEE 1394 bus belongs to the network management node;
- e) when a further adjacent IEEE 1394 bus of the configured IEEE 1394 bus belongs to another network management node, determining one of the network management node and the other network management node depending on a predetermined rule;
- f) initializing the interim network produced by the one of the network management node and the other network management node; and
- g) repeating the steps d) through f) by the other of the network management node and the other network management node.

7. The method according to claim 6, wherein:
the step c) comprises the steps of:
- c-1) assigning a bus identifier to the IEEE 1394 bus; and
- c-2) writing a unique identifier of the network management node to all the portals connected to the IEEE 1394 bus, and the step d) comprises the steps of:
- d-1) assigning a bus identifier to the a adjacent IEEE 1394 bus; and
- d-2) writing the unique identifier of the network management node to all the portals connected to the adjacent IEEE 1394 bus.

8. The method according to claim 7, wherein:
the step c) further comprises the steps of:
- c-3) creating a network topology map consisting of the IEEE 1394 bus; and
- c-4) creating a routing map of each portal connected to the IEEE 1394 bus, and the step d) further comprises the steps of:
- d-3) updating the network topology map to represent the interim network; and
- d-4) updating the routing map of each portal on the interim network to allow data transfer on the interim network.

9. The method according to claim 7, wherein:
in the step c-1), the bus identifier is written to all nodes connected to the IEEE 1394 bus;
in the step d-1), the bus identifier is written to all nodes connected to the adjacent IEEE 1394 bus; and
in the steps c-2) and d-2), the unique identifier of the network management node is a global unique identifier (GUID).

10. The method according to claim 6, wherein the step b) comprises the steps of:
comparing network management performance indexes of a plurality of nodes capable of network management; and
selecting the network management node depending on a comparison result.

11. The method according to claim 6, wherein the step b) comprises the steps of:
comparing physical identifiers of a plurality of nodes capable of network management; and
selecting the network management node depending on a comparison result.

12. The method according to claim 6, wherein the step b) comprises the steps of:
comparing unique identifiers of a plurality of nodes capable of network management; and
selecting the network management node depending on a comparison result.

13. The method according to claim 6, wherein the step e) comprises the steps of:
comparing network management performance indexes of the network management node and the other network management node; and selecting the one of the network management node and the other network management node depending on a comparison result.

14. The method according to claim 6, wherein the step e) comprises the steps of:

comparing unique identifiers of the network management node and the other network management node; and selecting the one of the network management node and the other network management node depending on a comparison result.

15. The method according to claim 6, wherein the step e) comprises the steps of:

comparing a number of IEEE 1394 buses on a first interim network produced by the network management node and a number of IEEE 1394 buses on a second interim network produced by on the other network management node; and selecting the one of the network management node and the other network management node depending on a comparison result.

16. The method according to claim 6, wherein the step e) comprises the steps of:

comparing a total number of nodes included in a first interim network produced by the network management node and a total number of nodes included in a second interim network produced by on the other network management node; and selecting the one of the network management node and the other network management node depending on a comparison result.

17. The method according to claim 3, wherein each of the portals of each bridge has a node identifier map comprising node identifiers of all the portals of the bridge, wherein the network topology map is created and updated by collecting node identifier maps from the portals on the configured IEEE 1394 bus.

18. The method according to claim 17, wherein, the node identifier map has a node identification field, to the node identification field, of a first portal having a unique identifier identical to the network management node, is written the bus identifier assigned to the IEEE 1394 bus connected to the first portal, and to the node identification field of another portal having a different value from the network management node is written a predetermined initial value.

19. A network management node for configuring an IEEE 1394 network to allow packet transfer between different IEEE 1394 buses, wherein the IEEE 1394 network is composed of a plurality of IEEE 1394 buses joined by at least one IEEE 1394 bridge having at least two portals, each of the portals having a single IEEE 1394 bus connected thereto, comprising:

first means for configuring a small network composed of a part of the IEEE 1394 network including an IEEE 1394 bus connected to the network management node; and second means for reconfiguring the small network into a new small network including an adjacent IEEE 1394 bus of the IEEE 1394 network and repeating reconfiguration of the new small network to configure a network consisting of all IEEE 1394 buses on the IEEE 1394 network, wherein the second means remains inactive until the first means completes configuration of the small network.

20. The network management node according to claim 19, wherein the first means comprises:

first writing means for writing a bus identifier to all nodes connected to the adjacent IEEE 1394 bus;

second writing means for writing a global unique identifier (GUID) of the network management node to all the portals connected to the adjacent IEEE 1394 bus;

means for producing a network topology map representing a topology of a reconfigured small network; and means for producing a routing map of each portal on the reconfigured small network to allow the packet transfer between IEEE 1394 buses on the reconfigured small network.

* * * * *